Figure 2:
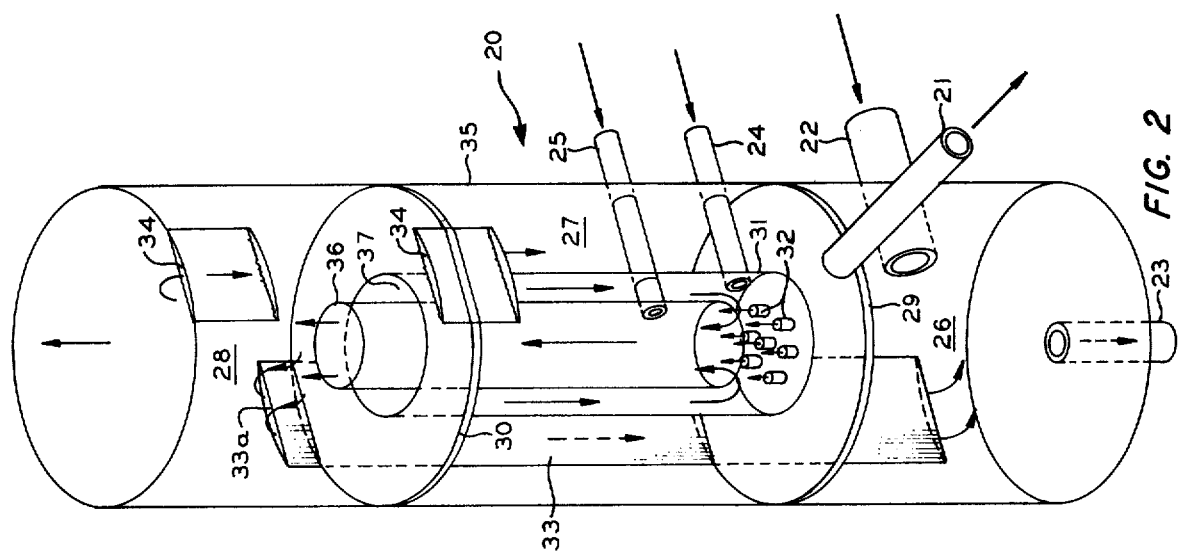

United States Patent [19]
Chapman

[11] 3,910,771
[45] Oct. 7, 1975

[54] APPARATUS FOR CONTACTING HF ALKYLATE CONTAINING ALKYL FLUORIDE WITH ADDITIONAL HF CATALYST TO CONVERT ALKYL FLUORIDE TO ADDITIONAL ALKYLATE

[75] Inventor: Charles C. Chapman, Bartlesville, Okla.

[73] Assignee: Phillips Petroleum Company, Bartlesville, Okla.

[22] Filed: May 30, 1973

[21] Appl. No.: 365,321

Related U.S. Application Data

[62] Division of Ser. No. 139,017, April 30, 1971.

[52] U.S. Cl. ............... 23/288 E; 23/285; 23/288 S; 260/683.42
[51] Int. Cl.² .... B01J 8/00; B01J 10/00; C07C 3/54
[58] Field of Search .. 23/285, 288 E, 288 D, 288 R, 23/288 S; 260/683.41, 683.42, 683.43, 683.45, 683.48; 138/37, 39

[56] References Cited
UNITED STATES PATENTS

| | | | |
|---|---|---|---|
| 3,134,655 | 5/1964 | Boucher | 138/37 X |
| 3,414,386 | 12/1968 | Mattix | 23/288 E |
| 3,485,893 | 12/1969 | Mayhue | 23/288 E X |
| 3,615,253 | 10/1971 | Warzel | 23/288 E X |

*Primary Examiner*—Morris O. Wolk
*Assistant Examiner*—Michael S. Marcus

[57] ABSTRACT

Alkyl fluoride in isoparaffin-olefin alkylate produced in presence of HF catalyst, e.g., an alkylate produced by alkylating isoparaffin with ethylene and isobutylene or propylene with an HF catalyst, is caused to alkylate an isoparaffin in the presence of additional HF acid catalyst by passing the alkylate upwardly through nozzles into a riser-reactor and at the nozzles admixing with the alkylate the additional HF acid of a desirable kind in a desirable quantity to cause conversion of the alkyl fluoride to additional alkylate, the apparatus in which the invention is carried out essentially being composed of a vessel having a lower, mid and upper sections, a riser-reactor conduit being juxtaposed over hydrocarbon spray nozzles in a partition between the lower and mid sections, but not extending down to said partition, a second conduit surrounding the riser-reactor conduit extending from said partition to an apertured partition between the mid and upper sections, said second conduit at its upper end being in sealing engagement with said apertured partition and in register with the aperture therein, said riser conduit extending to a level above said apertured partition, and downcomer means for flowing acid from said upper section to said lower section, downcomer means for flowing hydrocarbon from said upper section, in one embodiment, into a hydrocarbon surge section surrounding said second conduit and between said partitions, and means for feeding alkylate to said lower section and forcefully upwardly through said nozzles. In another embodiment an angular system comprises right angled conduits, an acid flow diverter over a hydrocarbon passage to divert down flowing acid from an opening to permit hydrocarbon to flow essentially horizontally through said opening is described.

4 Claims, 4 Drawing Figures

APPARATUS FOR CONTACTING HF ALKYLATE CONTAINING ALKYL FLUORIDE WITH ADDITIONAL HF CATALYST TO CONVERT ALKYL FLUORIDE TO ADDITIONAL ALKYLATE

This is a division of application Ser. No. 139,017, filed Apr. 30, 1971, now allowed.

This invention relates to alkylation of hydrocarbons. In one of its aspects, the invention relates to apparatus for contacting alkylate containing alkyl fluoride with additional HF catalyst to convert the alkyl fluoride to additional alkylate.

In one of its concepts, the invention provides an apparatus for carrying out a method for converting alkyl fluoride in an HF produced isoparaffin-olefin alkylate to additional alkylate by contacting the alkylate with additional acid by passing said alkylate upwardly through an alkylate subdividing zone into a riser-reactor zone and admixing with the subdivided alkylate stream as it emerges from the subdividing zone additional acid for intimate dissemination of the alkylate and the acid each into the other. In another of its concepts, the method of the invention provided steps in combination as described herein, further comprising the steps of passing upwardly the admixed alkylate and acid into an upper settling zone wherein there is formed a lower acid phase and an upper hydrocarbon phase, passing the acid phase downwardly from said settling zone to said alkylate subdividing zone for admixture with the subdivided alkylate as it emerges from said subdividing zone, also passing settled acid from said settling zone to a lower zone located below said alkylate subdividing zone to a point in said last-mentioned zone sufficiently below the same that there is created a head of acid which enables continued flow of the acid into said lower zone below said alkylate subdividing zone all the while alkylate is being forced into said zone below said alkylate subdividing zone and upwardly forcefully through said alkylate subdividing zone. In another concept of the method, as described, it further comprises passing hydrocarbon phase from said settling zone downwardly to a hydrocarbon surge zone surrounding said acid passing downwardly to said alkylate subdividing zone from said settling zone. Still further, a concept of the invention provides, in the method as described, the steps of introducing additional acid into the reacting hydrocarbon and acid and/or into the subdivided stream of alkylate, the introduced acid preferably being of a strength higher than the HF from the original reaction producing the alkyl fluoride containing alkylate, for example, being higher strength rerun HF and/or HF from overhead accumulators in the conventional alkylation operation and in one embodiment the higher strength acid being taken from a depropanizer overhead accumulator, as later described herein.

Thus according to a concept of the invention, there is provided an apparatus composed essentially of a riser-reactor conduit placed just above a nozzle means or group of nozzles from which a subdivided alkylate stream is sprayed upwardly into the lower end of said conduit, a second conduit surrounding the first mentioned conduit serving to convey acid to and therefore encompassing at its lower end the said nozzle means and at its upper end terminating just below the upper end of said first-mentioned conduit, an upper settling section wherein acid and hydrocarbon separate into phases, means for removing treated hydrocarbon from said upper section, means for flowing overflow acid from said upper section down into a section located below said nozzle means. In a further concept of the invention's apparatus, there are provided a vessel having extending through its mid section a riserreactor conduit, the upper portion of which extends upwardly through an aperture in a partition defining in said vessel an upper settling section and a mid section and at its lower section terminating just above nozzle spray means, said riser-reactor being surrounded by another conduit, thus forming an annulus therewith, said last-mentioned conduit being in sealing engagement with said partition and in register with the aperture or opening therein, thus permitting acid to flow down surrounding said first-mentioned conduit, said last mentioned conduit at its lower end being in sealing engagement with a second partition in which are mounted said nozzle spray means and encompassing said nozzle spray means, the last-mentioned partition defining in the bottom of said vessel a feed inlet section, and means for passing overflow acid from the upper section of said vessel above the first-mentioned partition down to a point in the lower section of said vessel below said second-mentioned partition in a manner as further described herein.

In another concept still, the apparatus of the invention provides an acid flow diverter means to divert acid flowing down a wall around an aperture through which hydrocarbon flowing down along with said acid to a side of said acid away from said wall can be caused to flow through an opening in said wall without entraining acid therewith.

In the alkylation of an isoparaffin, e.g., isobutane and/or isopentane with an olefin such as ethylene, especially in the presence of propylene and/or isobutylene, in the presence of hydrogen fluoride catalyst, under certain conditions, there is formed and recovered in the alkylate phase a substantial proportion of alkyl fluoride. If this alkyl fluoride can be cheaply or economically recovered by conversion thereof to additional high quality alkylate, the benefits of the kind of alkylation here contemplated can be achieved. The alkylation of an isoparaffin with ethylene in the presence of a higher olefin, e.g., propylene does not form a part of this invention. Such an alkylation operation is described and claimed elsewhere by other inventors.

It is an object of this invention to provide for the production of high quality alkylate which will have a high value octane or octane number of such value that it can be used to produce a motor fuel requiring little or no lead or other additive for satisfactory antiknock performance. Another object of the invention is to provide an apparatus for handling economically an alkylate containing alkyl fluoride and acid wherewith to convert the alkyl fluoride to additional high quality alkylate. A further object still is to provide an apparatus which can be economically constructed and readily operated and which is unitary in structure.

Other aspects, concepts, objects and the several advantages of the invention are apparent from a study of the disclosure, drawing and appended claims.

According to the present invention, there is provided an apparatus for carrying out a method for converting alkyl fluoride in an alkylate to additional alkylate by contacting the same with an isoparaffin using additional HF acid which comprises steps of introducing the alkyl fluoride containing alkylate into a lower section of an alkylate treating zone, in said zone passing alkylate upwardly into a mid section of said zone through a zone for subdividing said alkylate (which has isoparaffin such as isobutane therein) and then into an upwardly extending riser-reaction zone while introducing additional HF acid to the alkylate as it emerges from said alkylate subdividing zone and passes upwardly into said riser-reaction zone. Further, the method comprises passing reacted alkylate and acid upwardly to an upper section of said treating zone, permitting acid and hydrocarbon to settle out forming a lower acid phase and an upper hydrocarbon phase, removing the upper hydrocarbon phase, returning settled acid phase downwardly surrounding said riser-reaction zone to said alkylate subdividing zone for admixture of the acid there with the subdivided alkylate as it emerges from said subdividing zone. Still further, the method comprises passing a portion of acid from the upper settling section of said treating zone downwardly to the lower section of said treating zone with a head sufficient so as to permit pumping the raw alkylate into said lower zone and to pass the same forcefully upwardly through said alkylate subdividing zone into contact with acid therein.

The mass entering the higher pressure lower zone, or settling zone, which is operated liquid full, is the admixture or the HF reactor effluent comprising HF catalyst, which settles as a lower liquid phase, and alkylate, unreacted isoparaffin, e.g., isobutane, alkyl fluorides, and any unreacted olefin, which is the upper liquid phase. Further still, according to the method of the invention, additional acid can be introduced directly to the alkylate subdividing zone and/or into the riser-reaction zone.

Thus according to the invention, there is provided an apparatus comprising an upright vessel, said vessel having in the midsection thereof a riser-reactor conduit disposed just above a partition dividing said vessel into a midsection and a lower section, said partition having disposed therein a nozzle means or nozzles in open communication with said lower section and said riser-reactor conduit in a manner that raw alkylate (alkylate, unreacted isoparaffin, alkyl fluoride, and any unreacted olefins) forced upwardly through said nozzles from the lower section of said vessel will be ejected upwardly into said riser-reactor conduit, another conduit surrounding said riser-reactor conduit extending through the midportion of said vessel downwardly to and in sealing engagement with said partition, and at its upper end being sealingly engaged in register with an apertured partition, said apertured partition delineating the upper portion of said midsection and the bottom of an upper settling section in said vessel, said riser-reactor conduit extending somewhat above the last-mentioned partition, whereby acid settling in the upper settling section of said vessel can overflow said riser-reactor conduit and flow downwardly in the annulus between said conduits for admixture with subdivided alkylate emerging from the nozzle or spray means as more fully described later herein.

Still according to the invention, the apparatus comprises acid downcomer means for taking acid from above the upper partition and passing it down to a point well below the lower partition to provide a static head of acid as herein further described.

Figure 1:
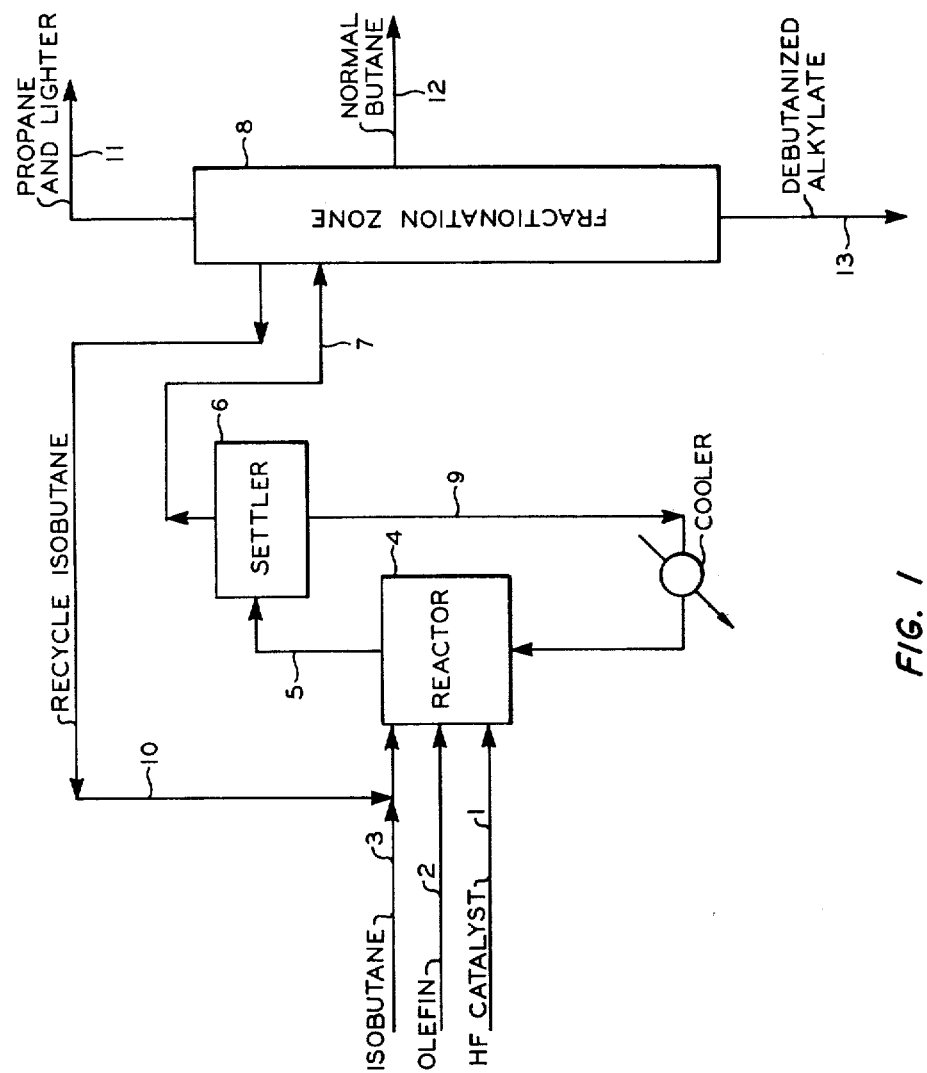

In the drawings, FIG. 1 is a simplified diagrammatic showing of the conventional alkylation process in which the general inclusion or placement of an apparatus of the invention with which the method of the invention can be effected is shown.

Figures 2A, 3:
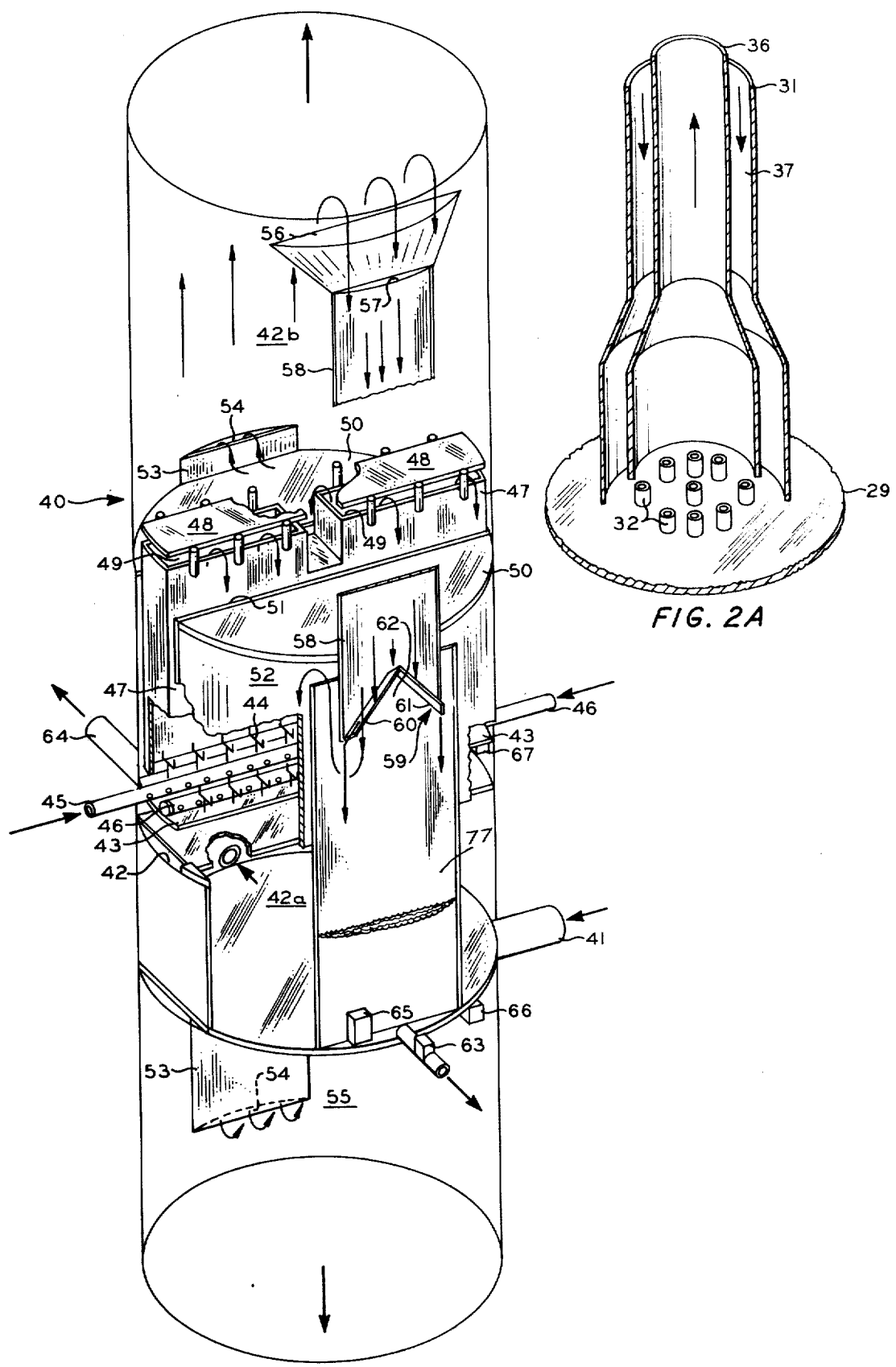

FIG. 2 shows a vertical isometric view partly cut away of an embodiment of the invention in which the apparatus is composed of an outer substantially cylindrical vessel in which concentric cylindrical or substantially cylindrical members or tubes form an axially disposed riser-reactor for causing the alkylation of the alkyl fluorides in the hydrocarbon phase taken from the conventional settler. FIG. 2A is an isometric view of a now preferred alternate shape or configuration of the bottom ends of the axially disposed concentric members.

FIG. 3 is an isometric view of a form of the apparatus of the invention in which the riser-reactor for the further alkylation with the alkyl fluoride is of a different or square or rectangular shape including structure.

Referring now to FIG. 1 of the drawings, HF catalyst, isoparaffin, say, isobutane, and olefin, say, ethylene, and isobutylene, are fed by 1, 2, and 3 into reactor 4 in which alkylation ensues. Effluent is passed from reactor 4 by 5 into settler 6 in which a hydrocarbon phase formed is passed by 7 into fractionation zone 8. Acid settled in 6 is returned by 9 into reactor 4. Recycle isobutane is charged to the reactor by 10. Propane and lighter, normal butane, and alkylate are recovered by 11, 12, and 13, respectively.

Referring now to FIGS. 1 and 2, according to the invention, the vessel 20 of FIG. 2 is substituted for the vessel 6 of FIG. 1. Thus, the acid settled and passed from settler 6 by 9 to reactor 4 is passed from the foot of vessel 20 to reactor 4. Disposition of the hydrocarbon phase from FIG. 2 will be more readily understood as later described. It can now be noted the hydrocarbon leaves FIG. 2 for the fractionation in zone 8 of FIG. 1 by side draw-off 21. The feed to vessel 20 is at 22 and 22 corresponds to 5 in FIG. 1.

Vessel 20 thus comprises inlet 22, for the reactor effluent admixture of hydrocarbon and HF catalyst from reactor 4, an outlet for acid 23 and an outlet for hydrocarbon 21. It also comprises auxiliary acid inlets 24 and 25 further described below.

There are in vessel 20 a bottom section generally indicated as 26, a midsection 27, and a top section 28. These sections are formed principally by partitions 29 and 30. An axially disposed pipe 31 extends to and is fixed as by welding to the two partitions. Within the base of pipe 31 and in the partition 29 are disposed nozzles 32 for injecting into pipe 36, described below, from section 26, operated liquid full, hydrocarbon forced into 26 through inlet 22, acid phase separating in 26 being returned to the reactor 4 at 23. The nozzles 32 are arranged so as to pass fluid only into pipe 36, described below.

Also in vessel 20 are acid downcomer 33 and hydrocarbon downcomer 34. Downcomer 33 communicates with the lower portion of section 28 and the lower portion of acid phase portion of section 26. Downcomer 34 communicates with the upper portion of section 28 and outer annulus 35 determined by the shell of vessel 20, pipe 31 and partitions 29 and 30. A pipe 36 extends within pipe 31 from a level just above nozzles 32 to a level just above the inlet 33a of acid downcomer 33. Annulus 37, formed between pipes 36 and pipe 31, affords passage of catalyst from 28 into pipe 36.

In operation, hydrocarbon and acid entering at 22 tend to form phases, the upper liquid phase being substantially but not completely formed of hydrocarbons, alkyl fluoride and some acid. The lower phase will be essentially separated liquid acid phase which can contain some acid soluble oil and some alkyl fluoride.

The relative lengths of the parts of the apparatus are calculated to provide that downcomer 33 shall extend sufficiently below the level of the nozzles 32, that the head of liquid catalyst will be great enough that the catalyst can enter zone 26, which is the zone of highest pressure. The pressure is sufficient to flow liquid hydrocarbon (alkylate, isoparaffin, alkyl fluorides) from liquid full zone 26 through nozzles 32.

Passing through the nozzles the hydrocarbon phase will rise upwardly in pipe 36, passing into section 28. Hydrocarbon will pass upwardly and into downcomer 34. Acid settling from the hydrocarbon emanating from the top of pipe 36 will pass downwardly through annulus 37 and will be encountered by jets of hydrocarbon emanating from nozzles 32. The hydrocarbon will admix with the acid catalyst, and in pipe 36 (reactor-riser) alkyl fluoride reacts with isoparaffin to produce additional alkylate product. Hydrocarbon will overflow into downcomer 34 and collect in annulus or hydrocarbon surge compartment 35 and is withdrawn at 21 for fractionation.

The thus-modified settler of the conventional unit or operation provides for the method an apparatus for a secondary reaction in which, in effect, in a second reaction zone, the alkyl fluoride is as ideally as possible converted to additional valuable alkylate, and in the now preferred form to which the invention applies this under conditions under which a high octane value alkylate, requiring little or no lead, is being produced, as when isoparaffin is alkylated with ethylene and, say, propylene and/or isobutylene, as described and claimed elsewhere, for example, in Ser. No. 79,405, filed Oct. 12, 1970, by Thomas Hutson, Jr. and Cecil O. Carter.

If desired, additional acid can be injected into the base of annulus 37 or into pipe 36 by 24 and/or 25 and this acid preferably will at least in part make-up, fresh or rerun acid to better reduce the alkyl fluoride content of the hydrocarbon phase and the acid therein contained.

Modification of the apparatus just described can be effected by one skilled in the art having studied the same. Thus, by way of example, there can be added level regulators at and to control the level of liquid on partitions 29 and 30. Such control can aid valuably in accomplishing a more precise control of reaction conditions and/or the amount of cooling which in some cases can be desirable, as when there is a high content of alkyl fluoride which this invention permits to obtain since it also enables its economic conversion to high quality alkylate.

In lieu of just one assemblage of pipes such as 31 and 36 with attendant nozzles there can be installed several like juxtapositionings. Pipes 31 and 36 need not be on the longitudinal axis of vessel 20.

Vessel 20 need not be circular in cross section taken at right angles to its longitudinal axis. More than one downcomer like 33 and/or 34 can be installed and such can take liquid from levels not necessarily the same, lending further flexibility to and control of the operation.

The relative proportions of the several sections and pipes and nozzles and the pressure drop through the nozzles can be selected by routine testing. It is desirable to obtain the best mixing at nozzles 32 of hydrocarbon and therefore also of alkyl fluorides and the catalyst acid. At such points for admixture at which considerable rapid reaction will occur heat liberated and tendency to be built up can be readily dissipated by maintaining acid and hydrocarbon flow and levels accordingly in and by virtue of the apparatus layout. Heat lost by radiation will cool the contents of the several sections or portions of vessel 20. The introduction of additional acid, which can be cool or cooled, can aid effectively to eliminate hot spots at the nozzles or at the points of greatest heat release.

Referring now to FIG. 2A shows a modification of the lower portion of pipes 36 and 31. The lower sections are belled out to allow use of more nozzles located beneath the enlarged section of pipe 36.

Referring now to FIG. 3, there is shown vessel 40 into which hydrocarbon and acid are fed at 41 into settler section 55, hydrocarbon passing upwardly through compartment 42 to below and then through plate 43 by means of nozzles 44. As shown, nozzles 44 are spaced to encompass pipes 45 and 46 which permit sparging into the hydrocarbon leaving the nozzles rerun and depropanizer accumulator acid of the usual alkylation operation. The acid and hydrocarbon mixture thoroughly intermingled rises in riser-reactor chamber 47 which is closed at its uppermost end by baffle or top plate 48. Acid and hydrocarbon exit chamber 47 at 49, acid settling on plate 50 and flowing into annulus 51 determined by chamber 47 and plate 52. Acid from annulus 51 together with acids from pipes 45 and 46 is intermingled with hydrocarbon emanating from the nozzle 44. A level of acid is maintained on plate 50 by weir or dam 53 over which excess acid falls into acid downcomer 54 which provides a leg of acid extending down into lower section 55 of vessel 40. This leg of acid will be sufficient in head that the pressure at its foot will permit its entering this higher pressure zone 55 into which the hydrocarbon and acid are pressured into the vessel at 41, and the rapid passing of separated hydrocarbon through the nozzles 44 to cause the intimate dissemination of the hydrocarbons and acid into each other to permit the alkyl fluoride to alkylate the hydrocarbon with isobutane present in the hydrocarbon phase.

Hydrocarbon phase 42b forming above plate 48 moves upwardly into funnel-like opening 56 of hydrocarbon downcomer 57. Entrained acid to an extent settles into the lower portion of funnel 56 and slides along the bottom or lower face thereof and downwardly along inside wall 58 of the downcomer 57 which with the vessel wall engenders the hydrocarbon downcomer 57. As the acid moves downwardly it encounters wedge-shaped or gable-like element 59 composed of two portions or plate-like elements 60 and 61, each attached to wall 58 to form an acute angle therewith to provide a fender to fend downcoming acid around opening 62 through which hydrocarbon in downcomer 57 enters chamber 42a while retaining the acid at the inside wall 58 of the downcomer 57. In effect, the hydrocarbon passes under the gable-like structure while the acid passes thereover.

The lower end of the hydrocarbon downcomer extends into an acid collection chamber 77, defined by a partition in the midsection of the vessel extending upward from the partition dividing the lower section 55 and the midsection. The partition defining the acid collection chamber extends to a point above the lowermost portion of the hydrocarbon downcomer 57. This insures that acid which has flowed down the gable-like means will pass into the acid collection chamber 77 rather than passing into the hydrocarbon surge section 42a.

At the lower portion of the chamber 77 is located on the eductor 63 which is powered by flowing depropanizer overhead accumulator acid, and this depropanizer overhead accumulator acid together with the acid in 77 an eductor. When an eductor is employed, a stream, for example, some or all of the raw alkylate or isoparaffin can be used.

In the example below the data are given for estimated specific places at which the apparatus handles the stated materials. These data are based upon general knowledge including data in the art and engineering considerations.

EXAMPLE

| (See FIGURE 2) | Ranges | Typical |
|---|---|---|
| $iC_4$/alkyl fluoride wt. ratio | — | 1444/1 |
| HF catalyst/alkyl fluoride vol. ratio | — | 45/1 |
| Alkyl fluorides in Hydrocarbon (22), wt % | 0.03–0.07 | 0.045 |
| Alkyl fluorides in HF catalyst (22), wt % | — | 2.5 |
| Alkyl fluorides, wt %: | | |
|   In system acid | — | 2.5 |
|   In rerun acid | — | 0.1 |
|   In $DC_3$ overhead accum. acid | — | 0.1 |
| Hydrocarbon Charge (22) B/D | — | 32,300 |
| HF Catalyst (22) B/D | — | 132,800 |
| Hydrocarbon via Nozzles (32), B/D | — | 32,300 |
| Rerun HF via (24), B/D (Added as vapor) | — | 215 B/D HF 790 B/D $iC_4$ |
| $DC_3$ O'head Accum. HF (25), B/D | — | 220 |
| Alkyl fluorides in Treated H/C (21), wt % | — | 0.007 |
| Additional alkylate produced, B/D | — | 5 |
| Value of additional alkylate, $/year | — | 11,000 |
| Temperature in (37), °F. | 40–150 | 100 |
| System Pressure, psig | 80–200 | 115 |
| ΔP across nozzles (32), psi | — | 3 |
| Number of Nozzles (32) | — | 210* |
| Orifice size, ea. nozzle, sq in | — | 0.304 |
| Diameter of Vessel (20), ft | 4 to 30 | 10 |
| Diameter of Conduit (31), ft | 1 to 7 | 2 1/3 |
| Diameter of Conduit (36), ft | 1 1/6 to 9 | 3 |
| Length of Conduit (31), ft | 30 (min) | 30 |
| Length of Conduit (36), ft | 30 (min) | 30** |
| Velocity through annulus (37), ft/sec | — | 2 |

*½" Pipe, 3" long each
**Starts 3" above plate is moved to the sparger pipe 46. Thus, the acid in 77 is recycled after its treatment to remove alkyl fluoride from the hydrocarbon and recontacts hydrocarbon at the nozzles.

Hydrocarbon is removed at 64 to fractionation. Float valves to provide acid and acidic hydrocarbon drainage when the apparatus is emptied are provided at 65, 66 and 67.

The relative sizes of the various portions of the apparatus of the invention, described, can be varied according to specific operations desired and can be readily determined by mere routine testing and/or calculation. In one embodiment, the vessels 20 and 40 can be of the order of 50 feet in length and 4 to 30 feet in diameter. The cross-sectional area of the riser-reactor will be from about one to about 65 square feet. The nozzles will have a pressure drop of about 5 psi. The number of nozzles will depend upon the volume of liquid to be passed through each nozzle and the total liquid to be jetted into the riser-reactor. The nozzles usually will be about 3 to 6 inches long with an aperture of from about ½ to about 1 inch in diameter. There will be about 210 nozzles to transfer about 32,300 barrels/day of untreated hydrocarbon from the settler into the vessel 20 and/or 40. Depending upon the desired result as more or less liquid is to be transferred from the settler to the treating vessels 20 and/or 40, more or less number of nozzles can be used. While in the method, as described, an acid downcomer of length sufficient to provide a head to permit pumping in the raw alkylate has been set forth. It is possible to employ method and means which are equivalent and functionally to this concept of the invention, e.g., pumping means for example, a pump or Reasonable variation and modification are possible within the scope of the foregoing disclosure, drawings and the appended claims to the invention the essence of which is that there have been provided apparatus for recontacting or treating HF alkylate with additional HF acid catalyst to reduce or eliminate alkyl fluoride therein producing additional valuable alkylate in which there is admixed a subdivided stream of the alkylate containing alkyl fluoride with HF acid at the base of a riser-reactor to which said stream is fed through a subdividing means to which is fed also HF acid catalyst and that said apparatus essentially is composed of an extended riser-reactor having a nozzled inlet at the base thereof and an outlet at the top thereof, an acid supply section surrounding said riser-reactor, communicating with said nozzled inlet, a settling section above the outlet of said riser-reactor, downcomer means for conducting separated hydrocarbon to a hydrocarbon surge section, in one embodiment said surge section surrounding said acid supply section, downcomer means for conducting acid from said setting section to a feed inlet section below said riser-reactor, and means for feeding hydrocarbon to be treated to said feed inlet section, in one embodiment there being provided additional acid feed inlet means to feed acid to said nozzled inlet and/or into said riser-reactor has also been set forth substantially as described.

I claim:

1. An apparatus for treating an alkylate produced from an isoparaffin-olefin alkylation in presence of hydrogen fluoride as an acid catalyst to remove alkyl fluoride therefrom and to produce additional alkylate which comprises:

a vessel defined by a top, a bottom, and sidewalls, said vessel being divided into three sections, the lower section having its upper end determined by a first partition, the midsection and the upper section being divided by an apertured partition, a first conduit extending upwardly from the top of the first partition to the bottom of the apertured partition, being in substantial register with the aperture, and being in sealing engagement with both partitions, a riser-reactor conduit located within said first conduit and extending upwardly from a level just above said first partition and extending into the upper section of the vessel to a level just above the top of the apertured partition, an inlet for passing alkylate and acid catalyst to be treated into the lower section of the vessel, nozzle means disposed in the first partition over a substantial area, but not all of the area of the partition, said nozzle means being encompassed by the first conduit and positioned such that fluids from the lower section passing through the nozzles are directed into the riser-reactor conduit, an acid downcomer means providing communication between the bottom of the upper section of the vessel and lower section of the vessel, said downcomer means having its uppermost portion at a level above the apertured partition, but below the upper end of the riser-reactor conduit and extending into the lower section of the vessel a sufficient distance below the nozzle means to insure that the head of liquid in the downcomer is great enough to permit the liquid to flow into the lower section when it is pressurized by the alkylate admitted through the inlet, and a means for removing hydrocarbon from the upper section of the vessel.

2. An apparatus according to claim 1 wherein the means for removing hydrocarbon comprises a surge section located in the midsection of the vessel between said first conduit and the inside of said vessel sidewalls and in said upper section of said vessel a hydrocarbon downcomer in open communication with said hydrocarbon surge section, the uppermost portion of said hydrocarbon downcomer being located above said acid downcomer so that hydrocarbon phase separating above the acid phase in said upper portion can flow into said hydrocarbon surge section.

3. The apparatus according to claim 2 wherein the hydrocarbon downcomer which provides communication between the upper section and the hydrocarbon surge section has at its upper end a funnel-shaped inlet and at the lower end an inverted V-shaped cut in the wall of the hydrocarbon downcomer that is nearest the center of said vessel, said cut having joined thereto a gable-shaped means comprising two plates attached to the inside of said downcomer such that each plate forms an acute angle with said hydrocarbon downcomer wall, said plates extending only partway across said hydrocarbon downcomer so that there is an opening between the plates and the wall of the hydrocarbon downcomer that is farthest from the center of the vessel so that hydrocarbon passing down the hydrocarbon downcomer can pass through said opening and under said gable-like means while acid flowing down the inside of the wall of the downcomer that is nearest the center of the vessel will be diverted from flowing under the gable-like means, said hydrocarbon downcomer extending into an open topped chamber in the midsection of the vessel, said chamber being defined by a partition which joins the inside wall of the vessel and extends upward from the partition dividing the lower section and midsection of the vessel to a level above the lowermost portion of the hydrocarbon downcomer, such that acid which has flowed down the gable-like means is prevented from passing into the hydrocarbon surge section while hydrocarbon which has flowed under the gable-like means can flow into the hydrocarbon surge section.

4. An apparatus according to claim 3 wherein the lower portion of the chamber contains an eductor which will serve to discharge the acid from said chamber and said vessel.

* * * * *